(12) United States Patent
Shirotani et al.

(10) Patent No.: US 6,248,172 B1
(45) Date of Patent: Jun. 19, 2001

(54) METHOD AND POSITIONING DOOR JIG FOR SELECTING COATING DOOR JIG

(75) Inventors: Toshitake Shirotani; Terushige Toiyama; Isao Maegawa; Isamu Kitamura, all of Suzuka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/267,629

(22) Filed: Mar. 15, 1999

(30) Foreign Application Priority Data

Mar. 16, 1998 (JP) ................................. 10-0654763

(51) Int. Cl.[7] ................................................. B05C 13/02
(52) U.S. Cl. ................................................ 118/500; 29/460
(58) Field of Search ............................. 118/500; 29/423, 29/458, 460; 269/281, 283, 239

(56) References Cited

U.S. PATENT DOCUMENTS 5,950,295 * 9/1999 Worden et al. ................ 118/500
6,086,958 * 7/2000 Russell et al. ................. 118/500

FOREIGN PATENT DOCUMENTS 61-229681 * 10/1986 (JP) .
9206644 8/1997 (JP) .

* cited by examiner

Primary Examiner—Laura Edwards
(74) Attorney, Agent, or Firm—Liniak, Berenato, Longacre & White

(57) ABSTRACT

A method and a positioning door jig for selecting a suitable coating door jig is disclosed. A coating door jig is temporarily connected between a door opening at a side of a vehicle body to be coated and a slide door so as to enable forward and rearward movement of the slide door. The coating door jig forms a constrained linkage for guiding the slide door along a predetermined locus. The coating door jig is selected depending on a kind of automobile to be coated by the use of a positioning door jig. The positioning door jig forms a non-constrained linkage comprising mechanismic elements same as those of the constrained linkage and another additional mechanismic element. After temporarily connecting the positioning door jig between the slide door and the door opening, the kinematic pair position connecting the additional mechanismic element and one of the said mechanismic elements is adjusted so as to specify relative positions of the respective mechanismic elements. The suitable coating door jig is selected based on the specified relative positions of the mechanismic elements.

17 Claims, 7 Drawing Sheets

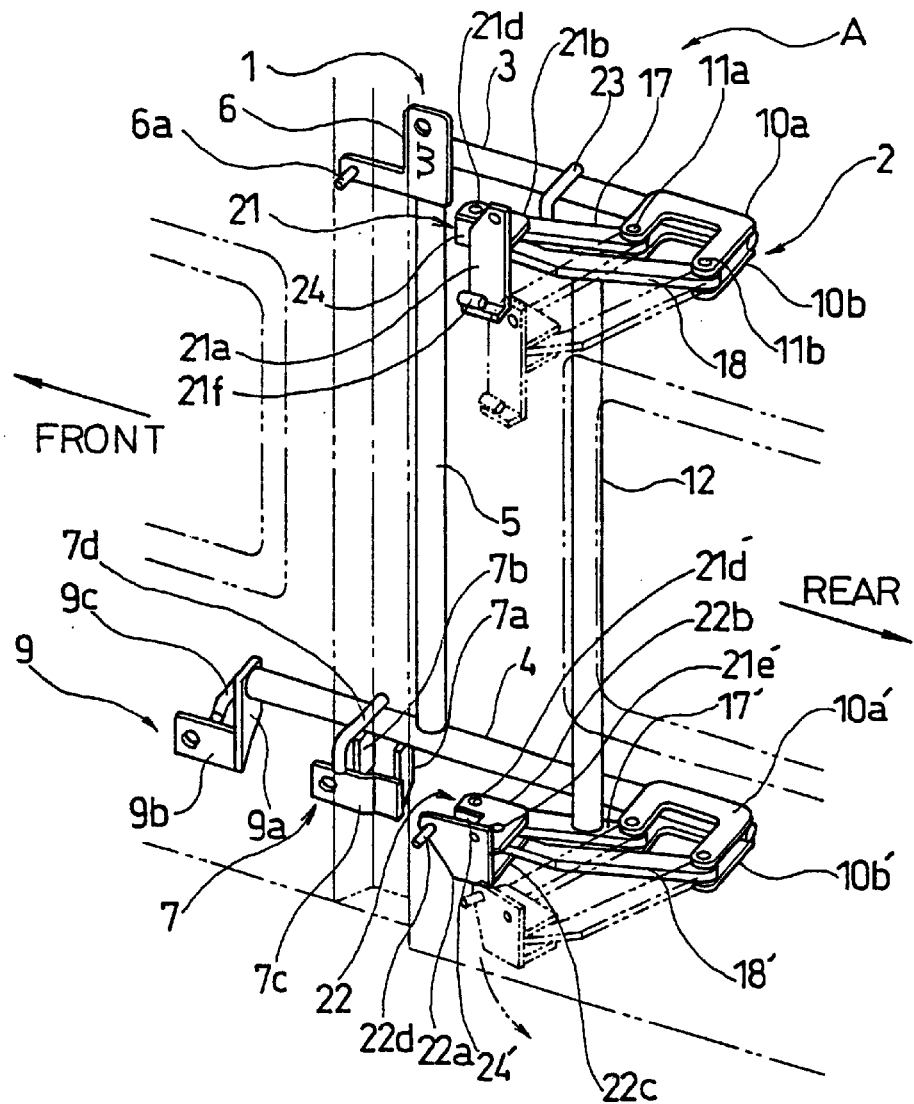
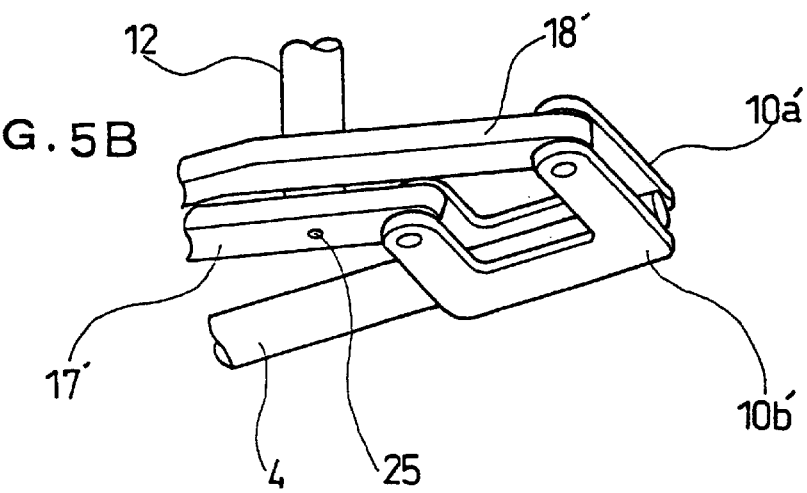

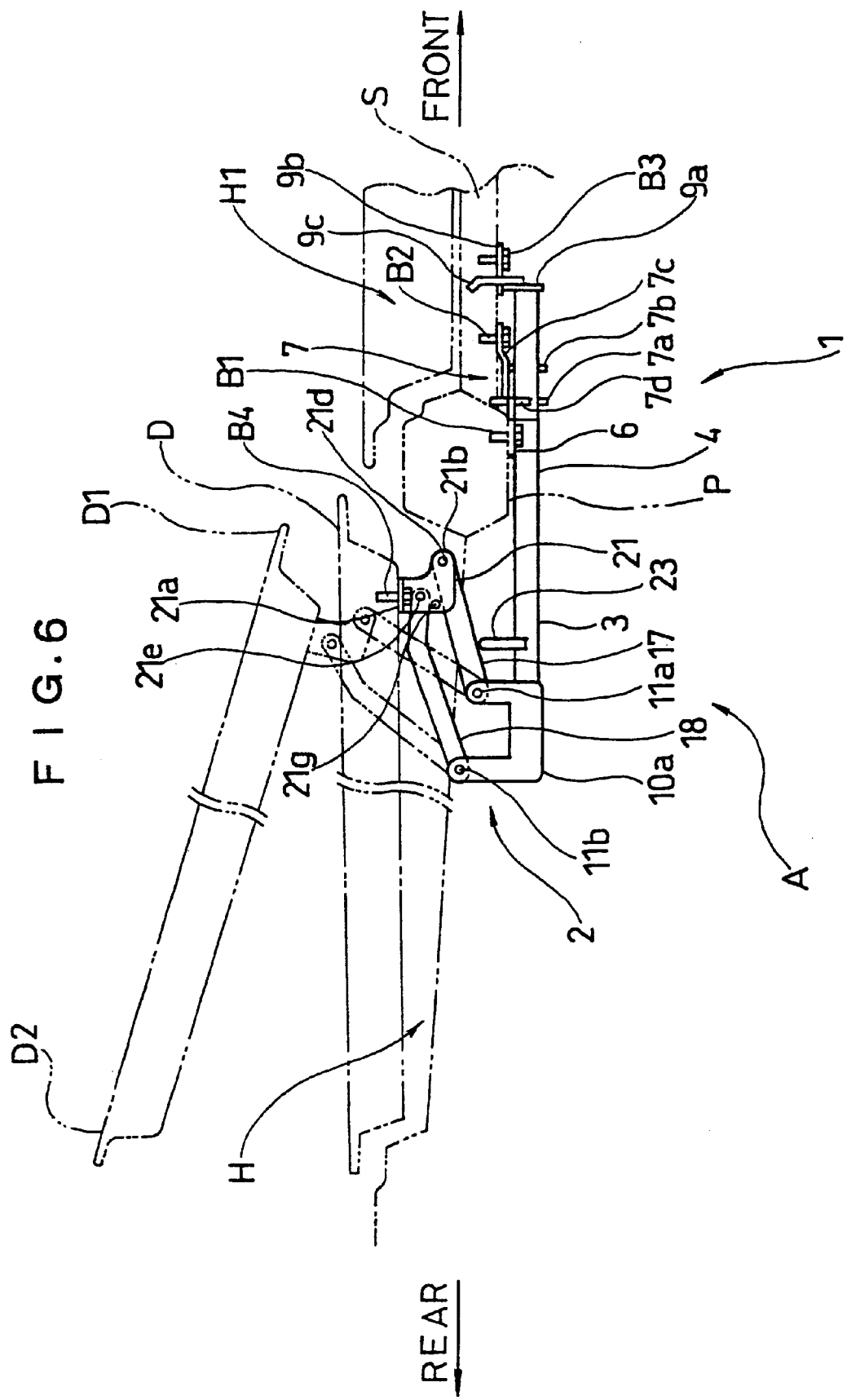

METHOD AND POSITIONING DOOR JIG FOR SELECTING COATING DOOR JIG

BACKGROUND OF THE INVENTION

1. Field of the invention

The present invention relates to a method for selecting a suitable coating door jig depending on a kind of automobile to be coated and a positioning door jig used for this purpose. The present invention also relates to a coating door jig selected by this method. The coating door jig is temporarily connected between a door opening at a side of a vehicle body to be coated and a slide door so as to enable forward and rearward movement of the slide door for opening and closing the door opening.

2. Prior art

When coating a vehicle body with slide doors, coating door jigs are used for temporarily connecting the slide doors to the vehicle body. The slide doors and the vehicle body are coated at one time so as to prevent the appearance of different color shades.

FIG. 7 is a sectional view showing a door opening H provided at a side of a vehicle body. A slide door D is connected to the door opening H by a conventional coating door jig K. The conventional coating door jig K connects one end D1 of the slide door D and an edge H1 of the door opening H. Here, the conventional coating door jig K shown in the solid line supports the slide door D at its closed position, where the slide door D is parallel to the side of the vehicle body, and the conventional coating door jig K shown in phantom supports the slide door D at its open position, where the other end D2 of the slide door D is away from the side of the vehicle body.

Such conventional coating door jig K comprises a hinge bracket K1 and a hinge arm K2 connected by a pin K3. The hinge bracket K1 is fixed to a center pillar P of the vehicle body through a bolt K4, and the hinge arm K2 is fixed to the front surface of the slide door D through a bolt K5, thereby pivotably supporting the slide door D with regard to the center pillar P of the vehicle body.

With the use of such conventional coating door jig K, a slide door D is temporarily connected to a side of a vehicle body at a certain position. However, since this connecting position differs depending on a kind or a shape of automobile, shape and size of a conventional door jig K should be considered so as to correspond to the vehicle body to be coated.

For this reason, simulation is carried out based on the design drawings of the automobile so as to select the most suitable conventional door jig K.

In the conventional coating door jig K, however, fine adjustment is required in the most cases when it is temporarily connected to the vehicle body. This is because size and shape of the conventional door jig K are specified by previous simulating. Further, fine adjustment of the conventional door jig K is tedious and time-consuming. Therefore, if the conventional coating door jig K is not applicable to the slide door, it may be replaced to another coating door jig K.

Replacement with another coating door jig K results in that a new set of coating door jigs K may be required since a number of coating door jigs K are used for each kind of automobiles to be coated. This is inconvenient and costly.

As shown in FIG. 7, the conventional coating door jig K is connected to the door opening H so that one end D1 of the slide door D is spaced apart from the opposing edge H1 of the door opening H. This is for preventing the end D1 of the slide door D from contacting with the edge H1 of the door opening H when opening and closing the slide door D. To this end, the other end D2 of the slide door D overlaps the vehicle body (OL in FIG. 7), and the slide door D is not positioned flush with the vehicle body when it is closed. The overlap OL causes a difference in distance between a spray gun for the coating operation and the slide door D, which leads to shading of color or incomplete coating at the shade under the overlapping slide door D when coating the vehicle body. This results in deteriorated coating quality of the finished vehicle body.

SUMMARY OF THE INVENTION

With the foregoing disadvantages of the prior art in view, the present invention seeks to provide a method for selecting a coating door jig depending on a kind of automobile to be coated, which coating door jig is temporarily connected between a door opening at a side of a vehicle body to be coated and a slide door so as to enable forward and rearward movement of the slide door for opening and closing the door opening, and forms a constrained linkage for guiding the slide door along a predetermined locus, the method comprising the steps of:

temporarily connecting a positioning door jig between one end of the slide door and an edge of the door opening, the positioning door jig having a non-constrained linkage comprising mechanismic elements same as those of said constrained linkage and another additional mechanismic element;

adjusting the kinematic pair position connecting the additional mechanismic element and one of said mechanismic elements, and specifying relative positions of the respective mechanismic elements constructing said non-constrained linkage; and selecting a suitable coating door jig based on the specified relative positions.

There is also provided a positioning door jig for selecting a coating door jig depending on a kind of automobile to be coated, which coating door jig is temporarily connected between a door opening at a side of a vehicle body to be coated and a slide door so as to enable forward and rearward movement of the slide door for opening and closing the door opening, and forms a constrained linkage for guiding the slide door along a predetermined locus, the positioning door jig comprising:

a hinge base detachably fixed to an edge of the door opening; and a hinge arm detachably fixed to one end of the slide door;

the hinge base and the hinge arm being connected so as to form therebetween a non-constrained linkage, the non-constrained linkage comprising mechanismic elements same as those of said constrained linkage and another additional mechanismic element, and the kinematic pair position connecting the additional mechanismic element and one of said mechanismic elements being adjustable by said additional mechanismic element.

Further, there is provided a coating door jig, which is temporarily connected between a door opening at a side of a vehicle body to be coated and a slide door so as to enable forward and rearward movement of the slide door for opening and closing the door opening, the coating door jig comprising: a hinge base detachably fixed to an edge of the door opening;

a hinge arm detachably fixed to one end of the slide door, the hinge base and the hinge arm being connected so as to form therebetween a constrained linkage for guiding the slide door along a predetermined locus, the constrained linkage comprising a plurality of mechanismic elements; and a cover provided at the outer side of the mechanismic element adjacent to the slide door.

Other objects and features of the present invention will become apparent by reference to the following detailed description taken in conjunction with the accompanying drawings.

BRIEF DESCRIPTION OF THE DRAWINGS

FIG. 5 is a schematic perspective view of a coating door jig temporarily connected to a vehicle body, in which FIG. 5A is a whole perspective view from the outside of the vehicle body, and FIG. 5B is a partly enlarged perspective view showing the bottom surface of the coating door jig.

FIG. 6 is a top view of a coating door jig.

DESCRIPTION OF THE PREFERRED EMBODIMENT

Figure 1A:
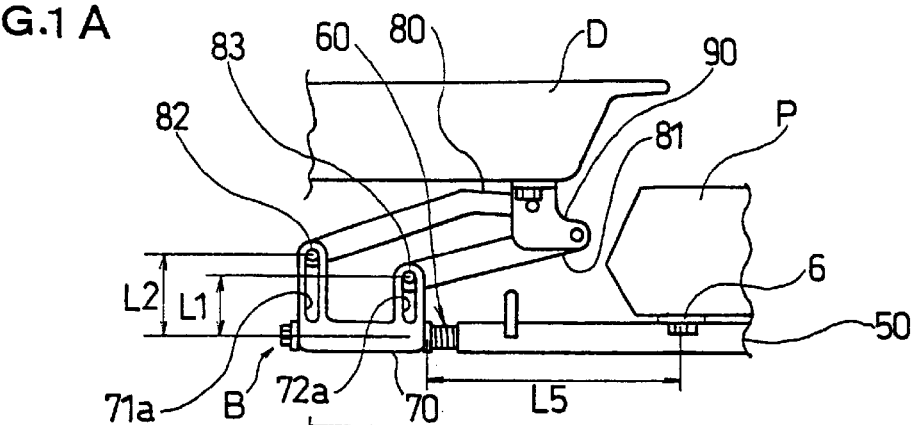
FIGS. 1A to 1D are explanatory view showing corresponding relations between coating door jigs and positioning door jigs of the present invention.

Referring to the drawings, a coating door jig according to the present invention is firstly described, and then, a method and a positioning door jig for specifying a suitable coating door jig are described.

Figure 4:
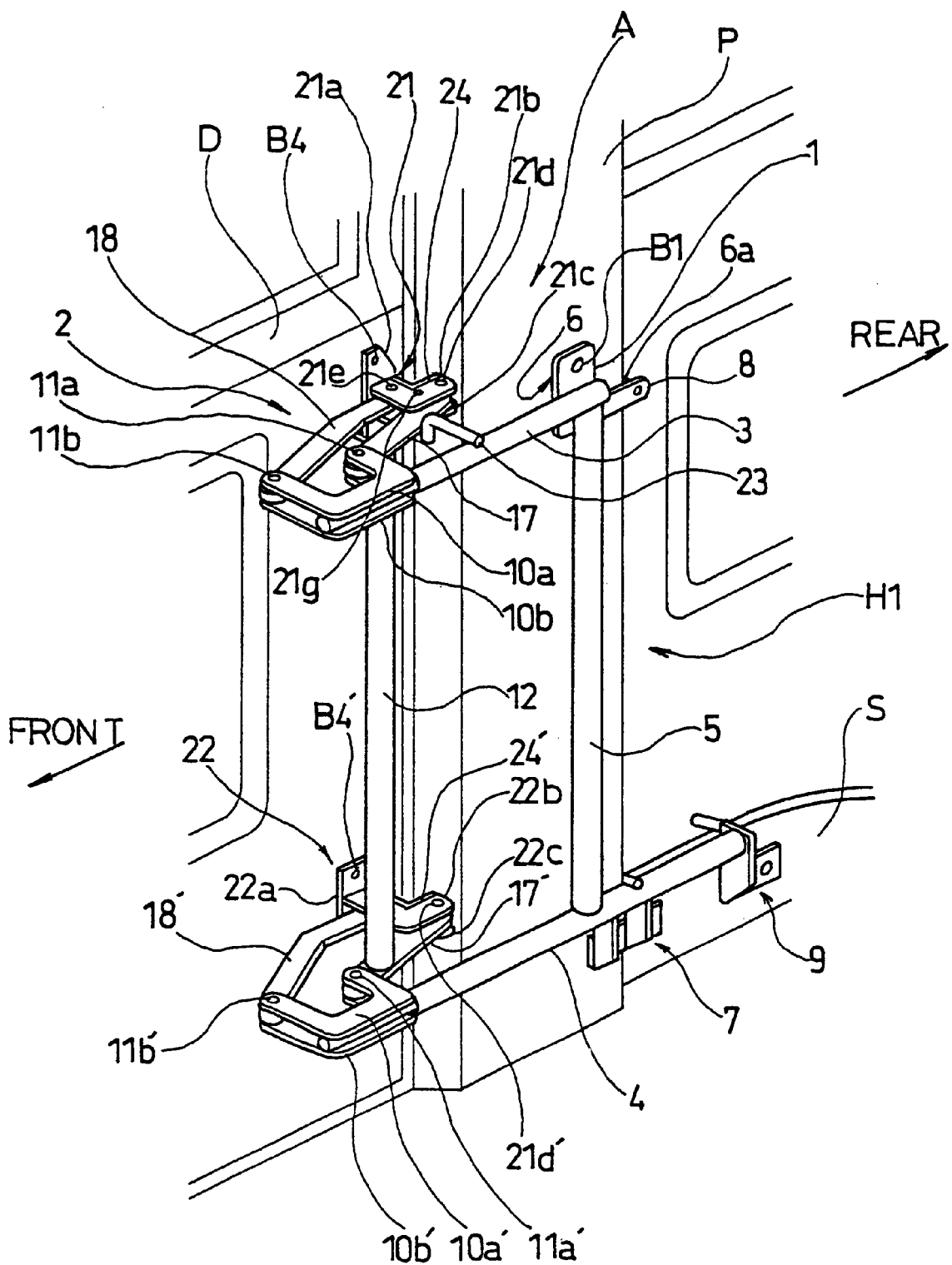
FIG. 4 is a perspective view of a coating door jig temporarily connected between a left-side slide door and a vehicle body, viewing from the inside of the vehicle body.
Figure 7:
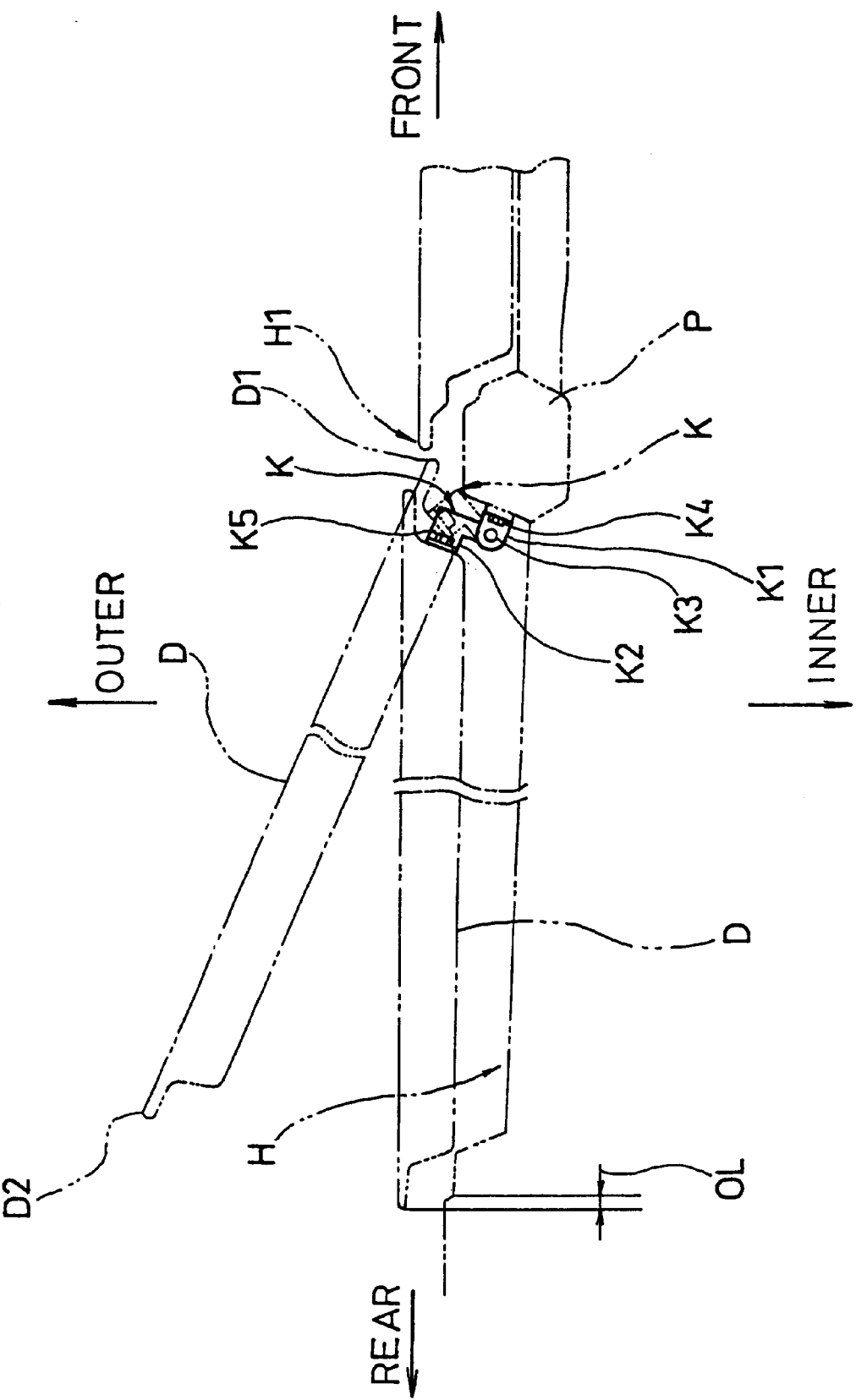
FIG. 7 is a top view of a conventional coating door jig.

Referring now to FIGS. 4 to 6, and particularly to FIG. 4, there is shown a coating door jig A, which comprises a hinge base 1 (FIG. 6) and a hinge arm 2. The hinge base 1 is fixed to an edge H1 of a door opening H provided at both sides of a vehicle body, while the hinge arm 2 is fixed to one end of a slide door D. The hinge base 1 and the hinge arm 2 are connected so as to form therebetween a constrained linkage for opening and closing the slide door D along a predetermined locus.

The hinge base 1 comprises an upper horizontal bar 3 and a lower horizontal bar 4 parallel to each other along the front-to-tail direction of the vehicle body, and a front vertical bar 5 connecting these upper and lower horizontal bars 3, 5. The front end of the upper horizontal bar 3 and the upper end of the front vertical bar 5 are connected to an upper bracket 6, which is mounted to a center pillar P of the vehicle body. The upper bracket 6 is an L-shaped member including vertical and horizontal elements. The free end of the vertical element is fixed to the center pillar P by a bolt B1 (FIG. 6), while the free end of the horizontal element forms a center pillar restricting rod 6a (FIG. 5).

The lower horizontal bar 4 is also connected to the lower end of the front vertical bar 5. However, the lower horizontal bar 4 has an extension on which a first lower bracket 7 and a second lower bracket 9 are provided. The first lower bracket 7 and the second lower bracket 9 are fixed to a side step S of the vehicle body by bolts B2, B3 (FIG. 6).

Extending downwardly from the lower horizontal bar 4 are two parallel vertical plates 7a, 7b. As shown in FIG. 5A, these vertical plates 7a, 7b support an offset horizontal plate 7c. The offset horizontal plate 7c is thready mounted to the side step S by a bolt B2 (FIG. 6). As shown in FIG. 5A, reference numeral 7d indicates a center pillar restricting rod. The front end of the center pillar restricting rod 7d is bent, while the base portion thereof is connected to the lower horizontal bar 4. The second lower bracket 9 has a vertical plate 9a and a horizontal plate 9b. The vertical plate 9a is connected to the front end of the lower horizontal bar 4, while the horizontal plate 9b is thready mounted to the side step S by the bolt B3. Reference numeral 9c indicates a bent rod connected to the vertical plate 9a.

The upper horizontal bar 3 and the lower horizontal bar 4 of the hinge base 1 are connected to the hinge arm 2 so as to form a constrained linkage. As shown in FIG. 4, the hinge arm 2 is fixed to the slide door D.

Details of the hinge arm 2 will be described below, in which corresponding parts are indicated by like reference characters with a dash.

As best seen in FIG. 4, two plate-like brackets 10a, 10b (hereinafter referred to as link brackets) are mounted on the rear end of the upper horizontal bar 3 with the two brackets holding therein the horizontal bar 3. The link brackets 10a, 10b having a U-shape configuration are provided with supporting axes 11a, 11b for pivotally supporting link arms 17, 18 respectively.

The link arm 17 is a thin plate member, the ends of which are rounded. A rear vertical bar 12 is connected at its upper end to the reverse side of the link arm 17. The other lower end of the rear vertical bar 12 is connected to a link arm 17' opposite to the link arm 17. The link arm 18 is a thin plate member slightly bent at the middle for preventing interference with other members.

Front ends of the link arms 17, 18 are connected to an upper door bracket 21. The upper door bracket 21 comprises a door mounting portion 21a, two parallel upper and lower L-shaped brackets 21b, 21c, and supporting axes 21d, 21e provided between the L-shaped brackets 21b, 21c. The supporting axis 2 id pivotally supports the link arm 17, and the supporting axis 21e pivotally supports the link arm 18.

As shown in FIG. 6, the door mounting portion 21a of the upper door bracket 21 is fixed to the slide door D through a bolt B4. A tubular receiving bracket 21f is provided at the reverse side of the door mounting portion 21a (FIG. 5A) for the engagement with a groove provided at the inner side of the slide door D.

Reference numeral 21g indicates a bolt and nut combination for firmly connecting the L-shaped brackets 21b, 21c. The bolt is threaded from the lower L-shaped bracket 21c to the upper L-shaped bracket 21b, and then tightened by the nut.

Link brackets 10a', 10b', supporting axes 11a', 11b' and link arms 17', 18' are provided at the lower horizontal bar 4. They are substantially the same as those provided at the rear end of the upper horizontal bar 3.

Link arms 17', 18' are pivotally supported between the link brackets 10a', 10b' so that a turning pair is formed. Front ends of the link arms 17', 18' are connected to a lower door bracket 22. The lower door bracket 22 is substantially the same as the upper door bracket 21. The lower door bracket 22 comprises a door mounting portion 22a, two parallel upper and lower L-shaped brackets 22b, 22c, and supporting axes 21d', 21e' provided between the L-shaped brackets 22b, 22c. The supporting axis 21d' pivotally supports the link arm 17', and the supporting axis 21e' pivotally supports the link arm 18'.

The door mounting portion 22a is fixed to the slide door D through a bolt B4'. As shown in FIG. 5A, the reverse side of the door mounting portion 22a is provided with a tapered positioning pin 22d. The positioning pin 22d is inserted into a corresponding aperture of the slide door D. The positioning pin 22d and the bolt B4' hold the lower door bracket 22 to the slide door D. Tapered shape of the positioning pin 22d is for facilitating the insertion of the positioning pin 22d into the aperture of the slide door D.

With such construction, a constrained linkage is formed between the hinge base 1 and the hinge arm 2. Here, the term "constrained linkage" means a linkage, in which degree of freedom is 1. Specifically, the constrained linkage comprises four mechanismic elements pivotally connected to each other, and when one mechanismic element is fixed, the other mechanismic elements move along a predetermined locus.

The constrained linkage according to the present invention will be described below. Since two identical constrained linkages are provided at the upper horizontal bar 3 and the lower horizontal bar 4, only one constrained linkage at the upper horizontal bar 3 will be described.

At the upper horizontal bar 3, the constrained linkage is formed by the two link brackets 10a, 10b, the link arms 17, 18, and the upper door bracket 21. These mechanismic elements are connected such that these four link elements (connecting rod members) form a turning pair.

Link brackets 10a, 10b are fixed to the center pillar P of the vehicle body through the upper horizontal bar 3. Therefore, the other mechanismic elements move along a predetermined locus. With such construction of the constrained linkage, the slide door D moves along the side of the vehicle body such that one edge D1 thereof moves away from the edge H1 of the door opening H (FIG. 6). Interference of the slide door D with the edge H of the door opening H and the overlap OL of the slide door D at its end D2 are therefore prevented.

The constrained linkage of the present invention is not limited to the above embodiment. As long as the slide door D is guided along a predetermined locus, any known linkage may be employed.

According to the present invention, the coating door jig A further includes a restricting rod 23. As shown in FIGS. 4 and 5, the restricting rod 23 restricts turning movement of the hinge arm 2 so that the closing position of the slide door D is determined. Provision of the restricting rod 23 prevents interference of the slide door D with the vehicle body. The closing position may be determined by a protrusion on the link arm 17, which abuts to the L-shaped bracket 21b, 21c.

Referring to FIGS. 4 and 5, reference numeral 24 indicates a cover provided at the outer side of the L-shaped brackets 21b, 21c. The cover 24 is provided at a position where no interference is made with the link arms 17, 18. The cover 24 ensures smooth turning movement of the link arms 17, 18 since the cover 24 protects the link arms from paint during the coating operation of the vehicle body. Reference numeral 24' indicates a cover provided at the outer side of the L-shaped brackets 22a, 22b.

As shown in FIG. 5B, the rear vertical bar 12 is a tubular member, the inner region of which communicates with a through aperture 25 provided at the link arm 17'. This enables reduced weight of the coating door jig A as well as drainage of the paint within the rear vertical bar 12.

According to the present invention, identification number is marked on each coating door jig A. For example, the number "3" is marked on the coating door jig A (FIG. 5A). Such identification numbers are used for maintenance purpose. When a malfunction of one coating door jig A is recognized, such coating door jig is specified from its own identification number. Provision of identification numbers facilitates maintenance of coating door jigs A.

Size or shape of a slide door D and a center pillar P is different depending on a kind of automobile to be coated. Therefore, when a coating door jig A of the present invention is mounted on a vehicle body, it should be modified in its size or shape so as to correspond to the vehicle body.

According to the present invention, there is provided a method for selecting a coating door jig A depending on a kind of automobile to be coated, in which a positioning door jig B having a non-constrained linkage is temporarily connected between one end D1 of the slide door D and an edge H1 of the door opening H, and relative positions of the respective mechanismic elements constructing the non-constrained linkage are specified.

Figure 2:
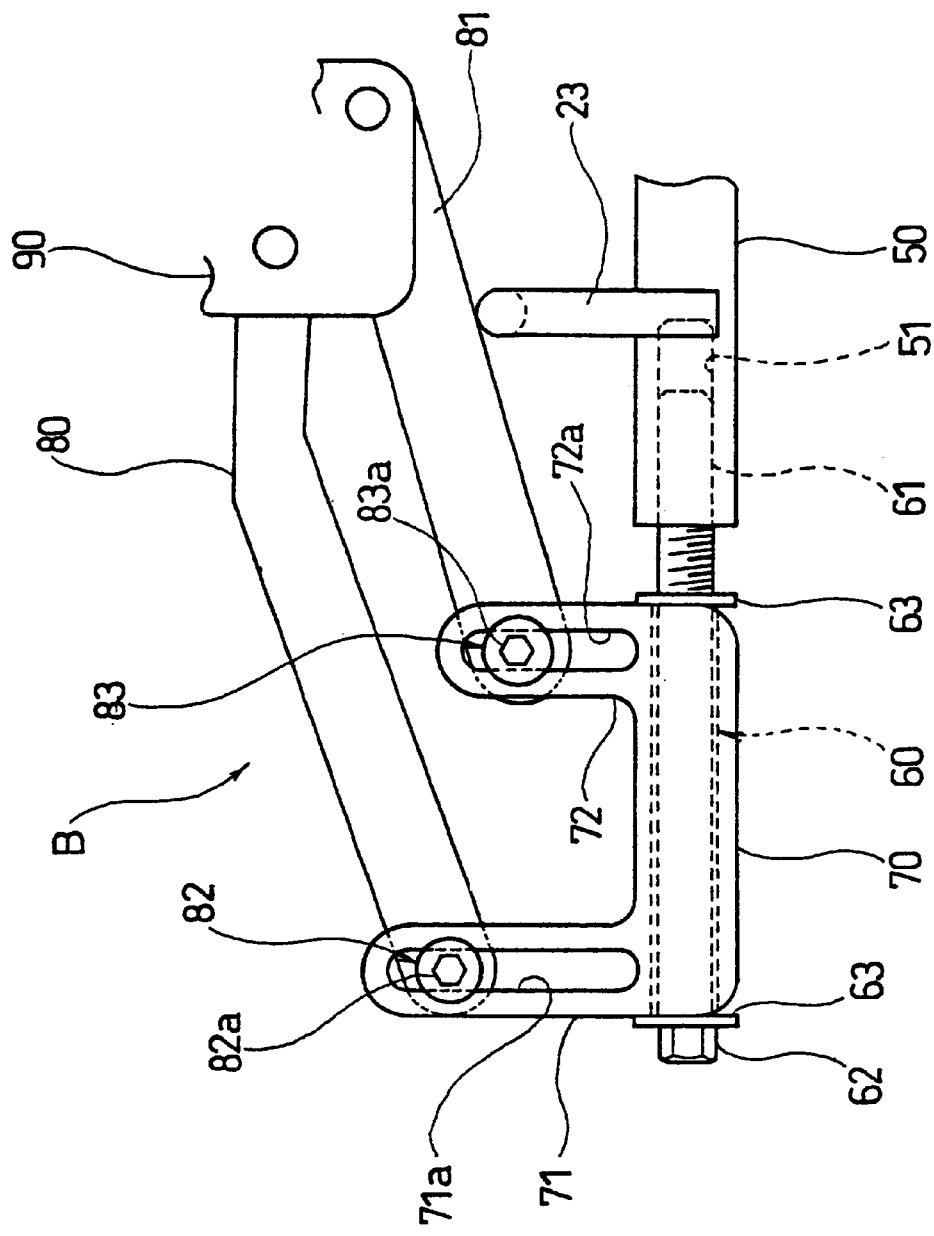
FIG. 2 shows a first embodiment of a positioning door jig according to the present invention.

Referring now to FIG. 2, a positioning door jig B according to the present invention will be described.

Construction of the positioning door jig B is similar to that of the coating door jig A except that a non-constrained linkage is formed in the positioning door jig B. The positioning door jig B will be described with respect to this non-constrained linkage. Since substantially identical non-constrained linkages are provided at an upper horizontal bar 50 and a lower horizontal bar (not shown), merely the non-constrained linkage at the upper horizontal bar 50 will be described.

A female thread 51 is provided at the front end of the upper horizontal bar 50 for the engagement with a male screw 61 of a connecting member 60. The connecting member 60 comprises two opposing U-shaped brackets 70, 70, a bolt 62 held between the U-shaped brackets 70, 70. Reference numeral 63 indicates a collar. Two leg portions 71, 72 of each U-shaped bracket 70 extend perpendicular to the axis of the upper horizontal bar 50. Extending longitudinally along the respective leg portions 71, 72 are guiding grooves 71a, 72a.

Support axes 82, 83 are mounted within the guiding grooves 71a, 72a. The support axes 82, 83 are slidable along the guiding grooves 71a, 72a, while they are stationarily held with respect to the guiding grooves 71a, 72a by way of bolt and nut combinations 82a, 83a.

Link arms 80, 81 are pivotally connected at one ends thereof to the support axes 82a, 83a respectively, and the other ends of the link arms 80, 81 are pivotally connected to a bracket 90. The bracket 90 is then fixed to the slide door D.

The U-shaped brackets 70, 70, the link arms 80, 81, and the bracket 90 form a constrained linkage which is similar to the constrained linkage of the coating door jig A. Specifically, the U-shaped brackets 70, 70, the link arms 80, 81, and the bracket 90 are corresponding to the link brackets 10a, 10b, link arms 18, 17, and the upper door bracket 21 of the coating door jig A. These mechanismic elements are connected so as to form a turning pair.

The positioning door jig B of the present invention further includes additional mechanismic elements such as guiding grooves 71a, 72a so as to form a non-constrained linkage. In other words, the positioning door jig B comprises further elements (slide elements) in addition to the turning pair between the U-shaped brackets 70, 70 and the bracket 90. In such arrangement, a sliding pair is formed with respect to the turning pair. Kinematic pair positions, i.e., contact points between these slide elements and other link elements (mechanismic elements to form the constrained linkage) are adjustable since the support axes 82, 83 are slidable along the guiding grooves 71a, 72a.

Here, the term "non-constrained linkage" means a link formed by the aforementioned constrained linkage and a further additional mechanismic element, and the degree of freedom is more than 2. In such non-constrained linkage, even if one mechanismic element is fixed, movement of the other mechanimic elements is not constrained.

In the positioning door jig B having the non-constrained linkage, movement of the hinge arm or the hinge base is not constrained along a particular locus. Therefore, relative positions of the respective mechanismic elements constructing the non-constrained linkage may be specified by the actual opening and closing operation of the slide door D after the positioning door jig B is temporarily connected between the slide door D and the vehicle body. The most suitable coating door jig A is selected based on the relative positions of the mechanismic elements.

The positioning door jig B is provided with a screw adjustment mechanism comprising a female thread 51 at the front end of the upper horizontal bar 50 and a male thread 61 of the connecting member 60. The connecting member 60 is adjustable along the axis of the upper horizontal bar 50 such that the distance between the connecting member 60 and the upper horizontal bar 50 may be increased or reduced. Therefore, the connecting point of the mechanismic element at the side adjacent to one edge H1 of the door opening H, i.e., the connecting point of the U-shaped brackets 70, 70 to the upper horizontal bar 50 is adjustable in the plane where the constrained linkage moves (link-working plane). The same screw adjustment mechanism is provided at the lower horizontal bar.

In this embodiment, the screw adjustment mechanism is provided at the side adjacent to the edge H1 of the door opening H. However, it may be provided at the opposite side adjacent to one end of the slide door D.

The positioning door jig B of the present invention is not limited to the above embodiment. For example, the non-constrained linkage may be formed by merely one guiding groove 71a or 72a at each U-shaped bracket 70, 70.

Figure 3:
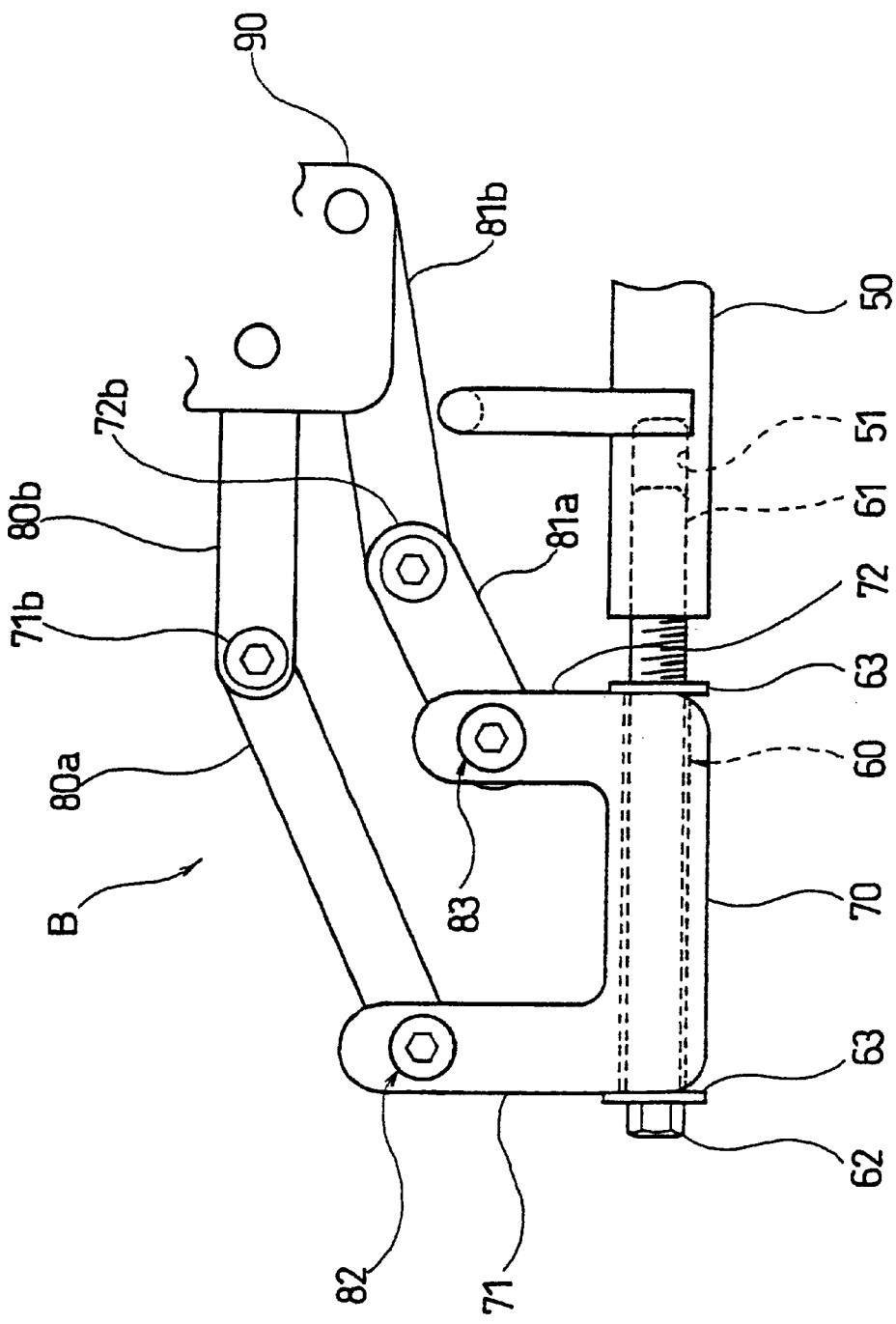
FIG. 3 shows a second embodiment of a positioning door jig according to the present invention.

As shown in FIG. 3, another turning pair may be employed in place of the sliding pair formed by the guiding grooves 71a, 72a. In this positioning door jig B, each link arm is formed by two plate members 80a, 80b or 81a, 81b. The plate members 80a, 80b or 81a, 81b are pivotally connected to each other by an adjustable support axis 71b or 72b. When the adjustable support axes 71b, 72b are tightened, the plate members 80a, 80b, 80c, 80d are stationarily held such that relative positions of the plate members are determined.

In this embodiment, the non-constrained linkage is formed by the mechanismic elements constructing the constrained linkage (U-shaped brackets 70, 70, link arms 80b, 81b, and the bracket 90) and further link elements such as link arms 80a, 81a.

Adjustment of the connecting member 60 along the axis of the upper horizontal bar 50 may be carried out by the use of a ratchet mechanism in place of the screw adjustment mechanism.

Referring now to FIG. 1, a method for selecting a suitable coating door jig A will be described. FIG. 1A and FIG. 1C respectively show a positioning door jig B temporarily connected between a vehicle body and a slide door D, while FIG. 1B and FIG. 1D respectively show a coating door jig A selected by the corresponding positioning door jig B.

Before selecting a coating door jig A, a positioning door jig B is temporarily connected between a vehicle body and a slide door D. The connecting member 60 is then moved along the axis of the upper horizontal bar 50 so that the most suitable position of the connecting member 60 is determined (FIG. 1A and FIG. 1C). When opening and closing the slide door D, the support axes 82, 83 displace along the guiding grooves 71a, 72a, therefore relative positions of the respective mechanismic elements are specified. A suitable coating door jig A is selected based on the thus specified relative positions. A positioning door jig B shown in FIG. 1A corresponds to a coating door jig A shown in FIG. 1B, while a positioning door jig B shown in FIG. 1C corresponds to a coating door jig A shown in FIG. 1D.

Figure 1B:
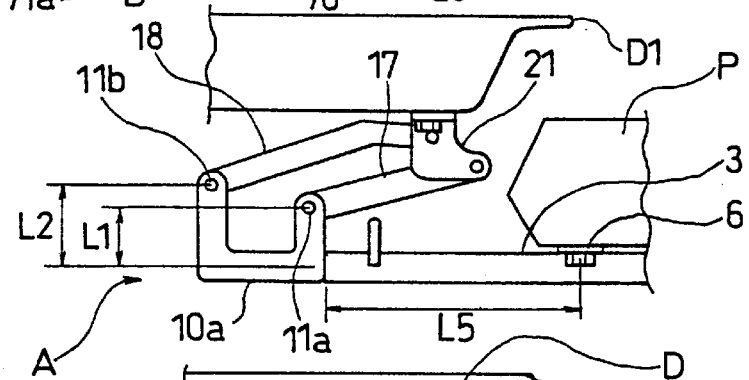
Figure 1C:
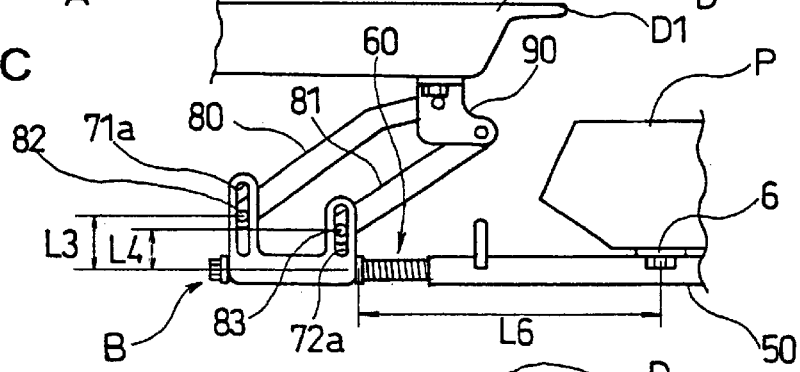
Figure 1D:
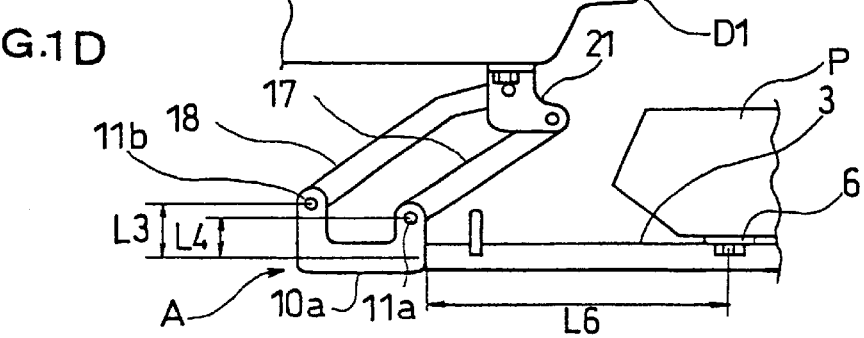

In the coating door jig A shown in FIG. 1B, Distance L1 and Distance L2 between the upper horizontal bar 3 and the supporting axes 11a, 11b are the same as Distance L1 and Distance L2 between the connecting member 60 and the support axes 82, 83 shown in FIG. 1A. Also, Distance L3 and Distance L4 of FIG. 1D are the same as Distance L3 and Distance L4 shown in FIG. 1C.

Distance L5 between the upper bracket 6 and the link bracket 10a of FIG. 1B is the same as Distance L5 between the upper bracket 6 and the U-shaped bracket 70 shown in FIG. 1A. Also, Distance L6 of FIG. 1D is the same as Distance L6 shown in FIG. 1C.

As mentioned above, a suitable coating door jig A is selected by specifying relative positions of the mechanismic elements constructing the non-constrained linkage of the positioning door jig B.

According to the present invention, previous simulation is not required since relative positions of the mechanismic elements are specified after the positioning door jig B is temporarily connected to the vehicle body.

Working efficiency of the coating operation is improved since fine adjustment of the coating door jig A is not required.

Moreover, one end of the slide door D does not contact with the edge of the door opening H when opening and closing the slide door D. Also, the other end of the slide door D does not overlap the vehicle body. Therefore, shading of color or incomplete coating can be prevented.

What is claimed is:

1. A positioning door jig for selecting a coating door jig depending on a kind of automobile to be coated, wherein a coating door jig is temporarily connected between a door opening at a side of a vehicle body to be coated and a slide door so as to enable forward and rearward movement of the slide door for opening and closing the door opening, and forms a constrained linkage having a first set of link elements for guiding the slide door along a predetermined locus, the positioning door jig comprising:

a hinge base detachably fixed to an edge of the door opening; and a hinge arm detachably fixed to one end of the slide door; the hinge base and the hinge arm being connected so as to form therebetween a non constrained linkage, the non constrained linkage comprising a second set of link elements having at least one additional link element than said first set of link elements, and a kinematic pair position connecting the additional link element and a remaining one of said second set of link elements being adjustable by said additional link element.

2. A positioning door jig according to claim 1, wherein said additional link element is a slide element.

3. A positioning door jig according to claim 1, wherein said additional link element is a link element.

4. A positioning door jig according to claim 3, wherein at least one of said second set of link elements is adjustable at a connecting point provided at a side adjacent to said slide door or at a second side adjacent to said door opening, and adjustment of the at least one of said second set of link elements element is carried out in a link working plane.

5. A positioning door jig according to claim 4, wherein said adjustment of the at least one of said second set of link elements is carried out by a screw pair.

6. A positioning door jig according to claim 4, wherein said adjustment of the at least one of said second set of link elements is carried out by a ratchet mechanism.

7. The positioning door jig according to claim 1, wherein said first set of link elements comprises four link elements.

8. The positioning door jig according to claim 1, wherein said first set of link elements comprises:
   a link bracket;
   a door bracket; and
   a pair of support arms connecting said link bracket and said door bracket.

9. A coating door jig, which is temporarily connected between a door opening at a side of a vehicle body to be coated and a slide door so as to enable forward and rearward movement of the slide door for opening and closing the door opening, and forms a constrained linkage having a first set of link elements for guiding the slide door along a predetermined locus, the coating door jig comprising:
   a hinge base detachably fixed to an edge of the door opening; and
   a hinge arm detachably fixed to one end of the slide door, the hinge base and the hinge arm being connected so as to form therebetween a non constrained linkage having a second set of link elements having at least one additional link element than said first set of link elements, and a kinematic pair position connecting the additional link element and a remaining one of said second set of link elements being adjustable by said additional link element.

10. The positioning door jig according to claim 9, wherein said first set of link elements comprises four link elements.

11. The positioning door jig according to claim 9, wherein said first set of link elements comprises:
   a link bracket;
   a door bracket; and
   a pair of support arms connecting said link bracket and said door bracket.

12. A coating door jig, which is temporarily connected between a door opening at a side of a vehicle body to be coated and a slide door so as to enable forward and rearward movement of the slide door for opening and closing the door opening, the coating door jig comprising:
   a hinge base detachably fixed to an edge of the door opening;
   a hinge arm detachably fixed to one end of the slide door, the hinge base and the hinge arm being connected so as to form therebetween a constrained linkage having a first set of link elements for guiding the slide door along a predetermined locus; and
   a cover provided at an outer side of one of the first set of link elements adjacent to the slide door.

13. A coating door jig, which is temporarily connected between a door opening at a side of a vehicle body to be coated and a slide door so as to enable forward and rearward movement of the slide door for opening and closing the door opening, the coating door jig comprising:
   a hinge base detachably fixed to an edge of the door opening;
   a hinge arm detachably fixed to one end of the slide door, and the hinge base and the hinge arm being connected so as to form therebetween a constrained linkage having a first set of link elements for guiding the slide door along a predetermined locus and one of the first set of link elements connected to said hinge base being formed by two opposing brackets.

14. A coating door jig according to claim 13, wherein said hinge arm is provided with a tapered positioning pin, which is inserted into a corresponding aperture of the slide door for facilitating the positioning of the hinge arm to said slide door.

15. A coating door jig according to claim 14, wherein two opposing upper and lower hinge arms are provided so as to form a pair of upper and lower constrained linkages, which are connected by a vertical tubular member, and said lower hinge arm is provided with a through aperture communicating with the inner region of said vertical tubular member.

16. A coating door jig according to claim 15, wherein identification number is marked.

17. A method for selecting a coating door jig depending on a kind of automobile to be coated, which coating door jig is temporarily connected between a door opening at a side of a vehicle body to be coated and a slide door so as to enable forward and rearward movement of the slide door for opening and closing the door opening, and forms a constrained linkage having a first set of link elements for guiding the slide door along a predetermined locus, the method comprising the steps of:
   temporarily connecting a positioning door jig between one end of the slide door and an edge of the door opening, the positioning door jig having a non constrained linkage having a second set of link elements having at least one additional link element than said first set of link elements; adjusting a kinematic pair position connecting the additional ink element of said second set of link elements and another one of said second set of link elements, and specifying relative positions of the respective second set of link elements constructing said non constrained linkage; and
   selecting a suitable coating door jig based on the specified relative positions.

* * * * *